US006636300B2

(12) United States Patent
Doemens et al.

(10) Patent No.: US 6,636,300 B2
(45) Date of Patent: Oct. 21, 2003

(54) SPATIALLY RESOLVING RANGE-FINDING SYSTEM

(75) Inventors: Guenter Doemens, Holzkirchen (DE); Peter Mengel, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/944,496

(22) Filed: Aug. 31, 2001

(65) Prior Publication Data

US 2002/0003617 A1 Jan. 10, 2002

Related U.S. Application Data

(63) Continuation of application No. PCT/DE00/00814, filed on Mar. 16, 2000.

(30) Foreign Application Priority Data

Mar. 18, 1999 (DE) .......................... 199 12 196

(51) Int. Cl.[7] .............................. G01B 11/26; G01C 3/08
(52) U.S. Cl. .................. 356/141.1; 356/4.01; 356/5.01; 356/5.1
(58) Field of Search .............................. 356/5.01–5.15, 356/141.1; 180/169

(56) References Cited

U.S. PATENT DOCUMENTS

| 4,229,103 A | | 10/1980 | Hipp ......................... 356/141 |
| 4,319,332 A | | 3/1982 | Mehnert ...................... 364/516 |
| 5,047,776 A | * | 9/1991 | Baller |
| 5,210,586 A | * | 5/1993 | Grage et al. |
| 5,784,023 A | | 7/1998 | Bluege ........................ 342/104 |
| 5,856,667 A | | 1/1999 | Spirig et al. ............. 250/208.1 |
| 5,953,110 A | * | 9/1999 | Burns ........................ 356/5.01 |
| 6,031,600 A | * | 2/2000 | Winner et al. |
| 6,207,967 B1 | * | 3/2001 | Hochstein ................... 250/574 |

FOREIGN PATENT DOCUMENTS

| DE | 3915627 | 11/1990 |
| EP | 0435011 | 11/1990 |
| EP | (A2) 0396865 | 11/1990 |
| EP | (A3) 0396865 | 11/1990 |
| EP | 0701145 | 3/1996 |

OTHER PUBLICATIONS

Photonics Technology World, "Laser–Radar Imaging Without Scanners", Photonics Spectra, Apr. 1994, pp. 28–29.

* cited by examiner

Primary Examiner—Stephen C. Buczinski
(74) Attorney, Agent, or Firm—Baker Botts L.L.P.

(57) ABSTRACT

In a spatially resolving range-finding system, an object is illuminated in a pixelwise fashion by illuminating beams emanating from an array of light sources with returned imaging beams striking a corresponding array of solid state receiving elements. The particular arrangement of the light sources and the receiving elements may be varied. The laser light sources and receiving elements may be selectively operated such that one light source may illuminate one or more receiving elements or several light sources may illuminate a single receiving element. The light sources are driven serially, allowing limits of laser protection regulations to be reliably complied with. An advantage is a substantially better signal quality at the receiving elements.

14 Claims, 3 Drawing Sheets

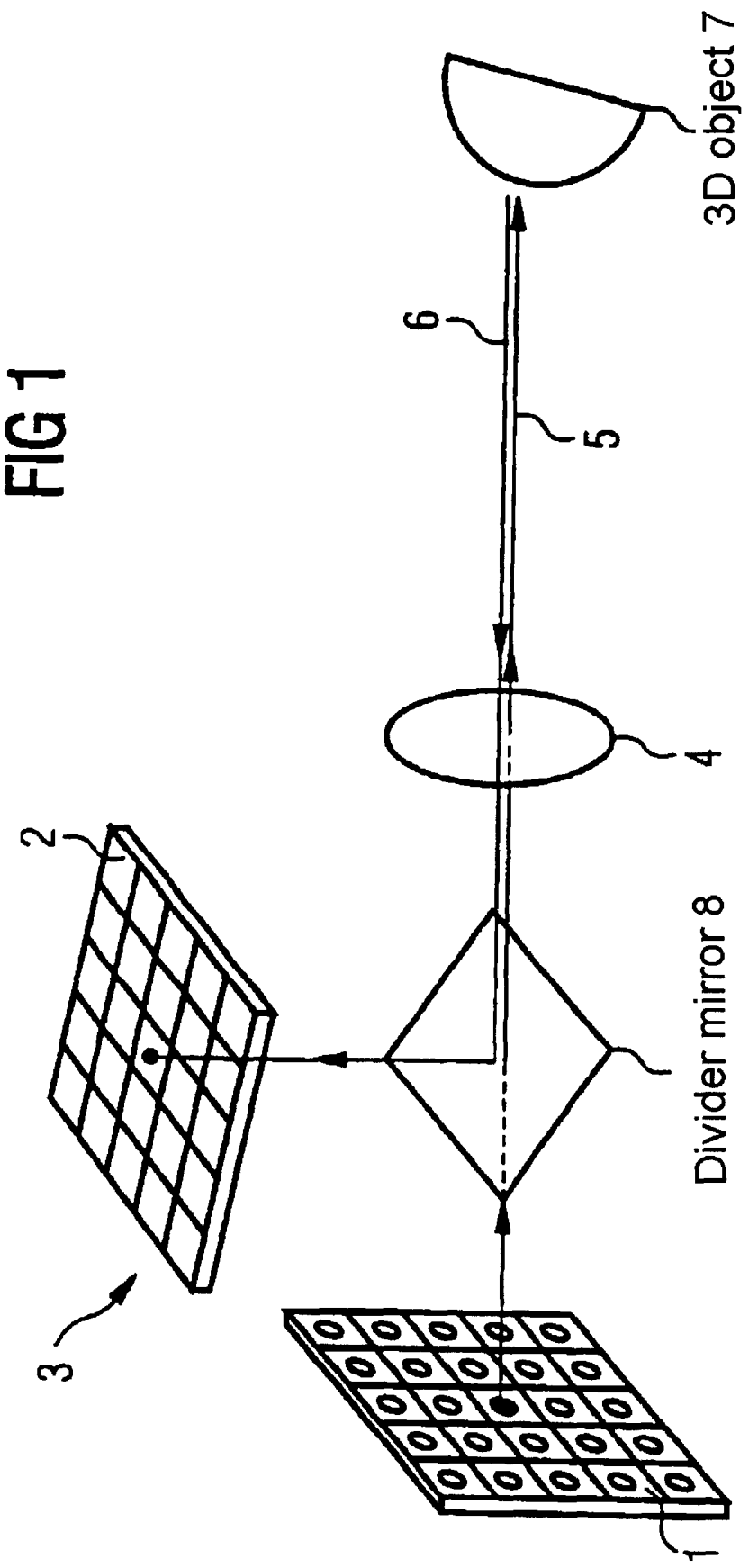

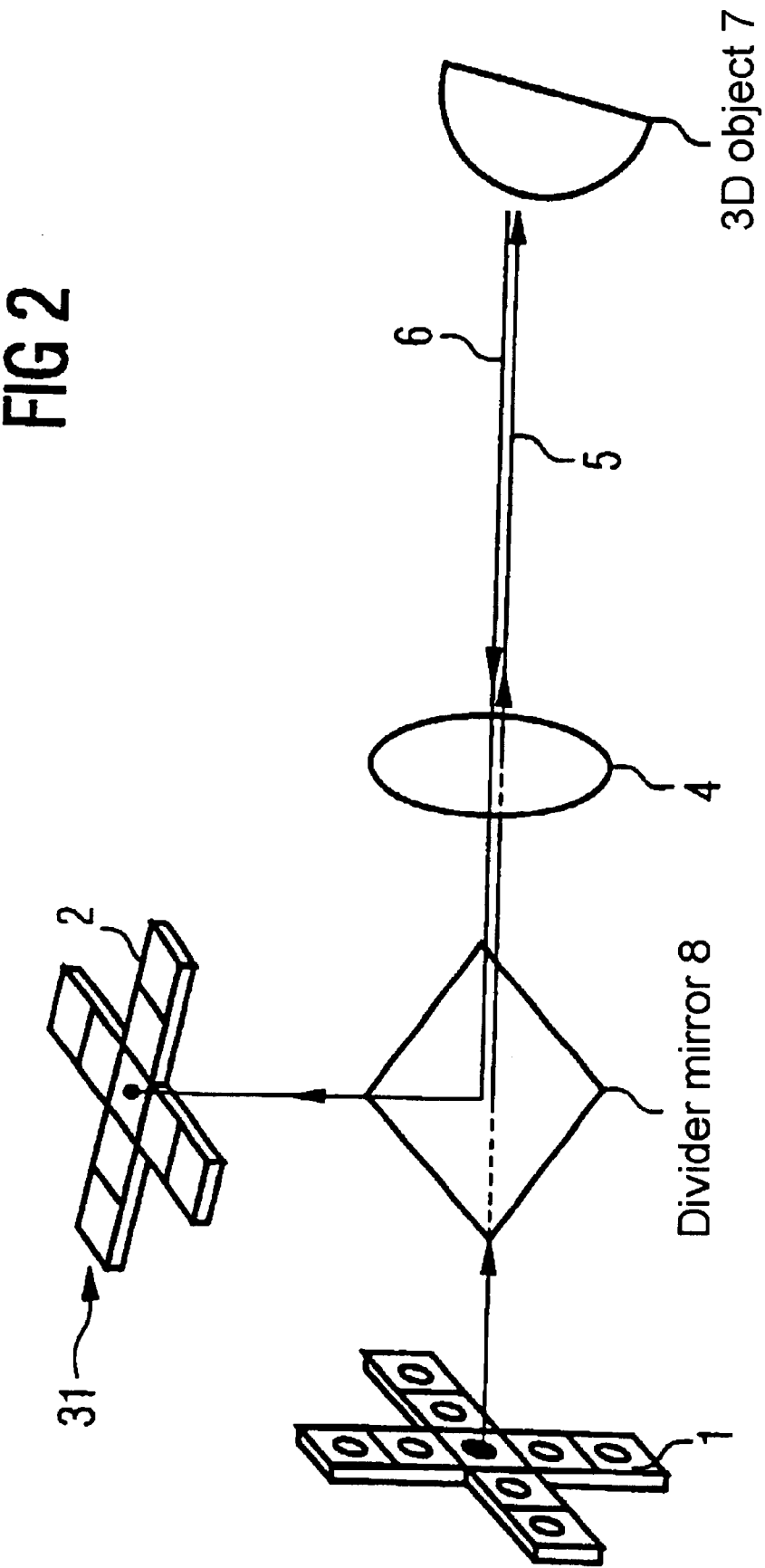

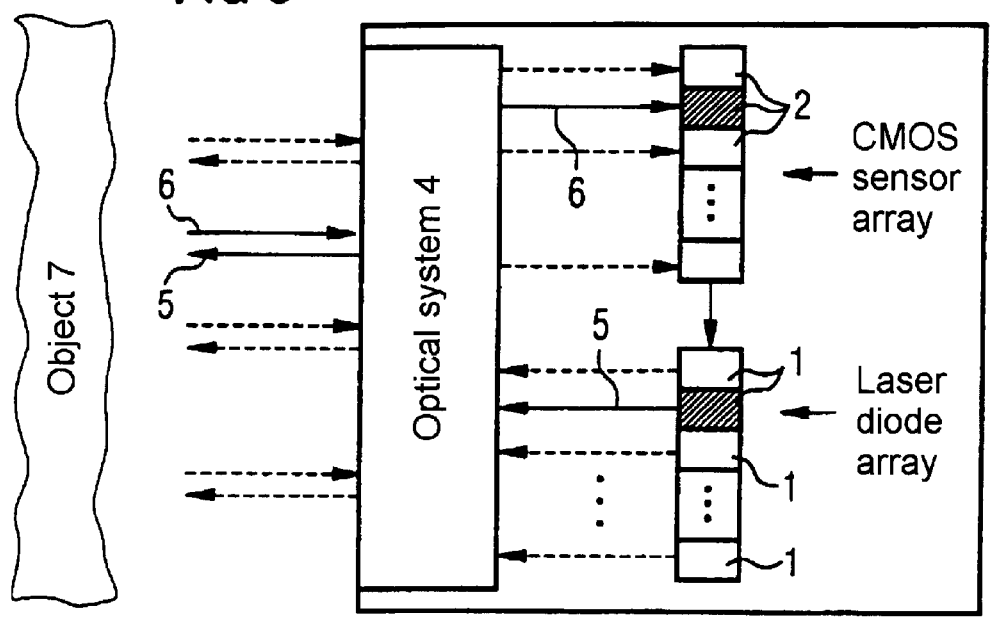
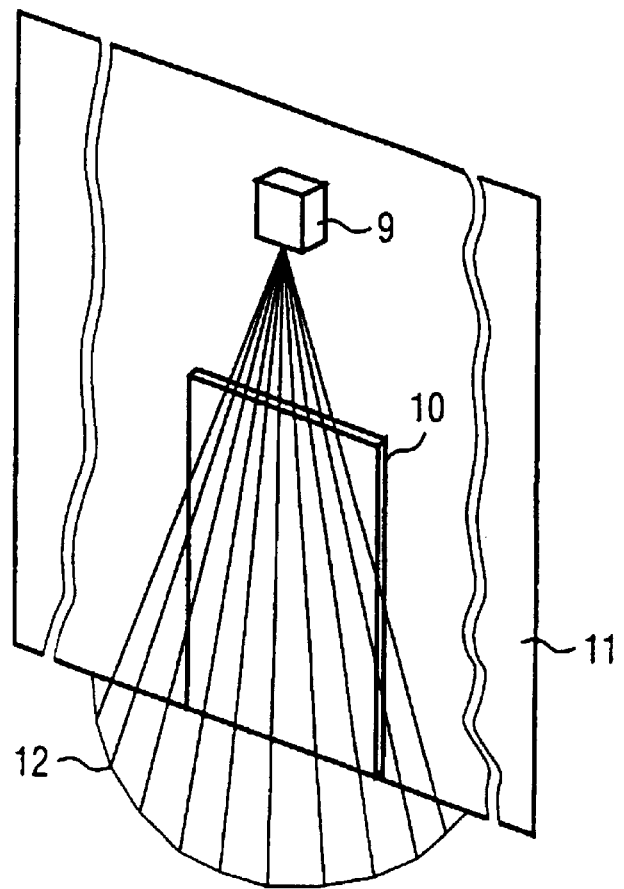

SPATIALLY RESOLVING RANGE-FINDING SYSTEM

This is Continuation of Application No. PCT/DE00/00814, filed Mar. 16, 2000.

BACKGROUND OF THE INVENTION

The invention relates to a spatially resolving range-finding system for constructing three-dimensional objects. Such systems are preferably used to identify persons or objects for the purpose of access control or for general surveillance tasks. Sensor systems which record and process in three dimensions are becoming increasingly important for the most varied tasks in industrial technology. The conceivable applications are extremely manifold and comprehensive and must be supported by a new generation of optical sensors for industrial metrology.

Known optical radar systems, such as laser radar, for example, are based either on the principle of laser pulse travel time measurement or on the determination of the phase indifference of modulated laser light for the purpose of deriving the object distance. Mechanical scanning devices are additionally required for the purpose of constructing a three-dimensional imaging system. This leads to a relatively expensive electronic and mechanical outlay which restricts the use of such three dimensional systems to a few special applications.

Also known are methods in which depth photos are obtained (gated view) with the aid of short term laser illumination and electrooptic switches as well as with CCD cameras. Disadvantages of these sensors reside in a high laser power and in expensive electrooptic shutters. Since CCD cameras generally are operated only according to the television standard, only long read out times can be achieved.

It is the object of the invention to provide, by avoiding the disadvantages of the prior art, a spatially resolving range-finding system with the aid of which it is possible to generate three-dimensional images rapidly and cost-effectively.

This object is achieved by means of the combination of features corresponding to claim 1.

A substantial feature of the invention resides in executing the implementation of the range-finding system using only solid state technology. Furthermore, an single relatively strong light source is replaced by an arrangement, for example in the form of a matrix, of weaker light sources. The light power in relation to the previously high power of a single light source is reduced in relation to the whole-area illumination relative to the number of pixels. The range-finding system manages without moving parts. Limits of laser protection regulations can be observed straight away. Owing to the corresponding arrangement of light sources, on the one hand, and receiving elements of a solid state image converter, on the other hand, it is possible for the object points illuminated by a light source and thereby defined to be respectively received with accurate assignment by a receiving element of the solid state image converter and evaluated with regard to the range.

The distribution of a relatively high light power over a multiplicity of light sources with a prescribed arrangement produces advantages such as a shorter rise time of the amplitude of the light, a higher accuracy of the measurement and ease of compliance with limits, for example from laser protection regulations.

The range-finding system resolves pixels such that individual object points or their range or their contour value can be imaged in a differentiated fashion. This is achieved, in particular, by an advantageous configuration in which the system is provided with light sources which can be driven by random access and receiving elements which can be read out by random access. The correspondence between light sources and receiving elements can advantageously be varied in such a way that not only is there a 1:1 assignment, but, for example, one light source may correspond to several receiving elements combined to form one group. Equally, a group of light sources can serve a single receiving element.

The result of a measurement consists in a generated three-dimensional image of an object, a contour image, or in the form of a sectional view which reproduces the external shape of the object at a specific section of the object with the aid of the illuminating beams.

A whole-area illumination of an object is expediently performed with the aid of a whole-area arrangement with respectively dedicated light sources and receiving elements. It is advantageous for these arrangements respectively to be designed rectangularly in the form of a matrix. If there is no need for such a whole-area illumination or measurement of an object, the light sources and the receiving elements can be arranged in a fashion matched to the task. This means, for example, that, while retaining the correspondence between light sources and receiving elements, a specific line or surface is selected in each case as their arrangement, a corresponding line or surface on the object being detected. Designing this arrangement in a fashion matched to the task is taken to mean that the corresponding arrangements of the light source and the receiving elements are adapted to the shape of the object or to probable positions of the object.

It is advantageous to use modulable laser diodes as light sources. The design of the solid state image converter in the form of an CMOS (metal oxide semiconductor) image converter is associated with a cost-effective design which permits individual receiving elements to be read out by random access in a rapid and reliable fashion.

The use of a spatially resolving range-finding system according to the invention for the purpose of building entrance safeguarding is associated with particular advantages. An appropriate sensor operates with light and not with other, potentially damaging radiations. If laser diodes are used, their individual light power is so low that laser protection regulations are complied with straight away. The arrangement or configuration of the transmitting and receiving units of the measuring system can be adapted specifically to the object.

Exemplary embodiments which do not limit the invention are described below with the aid of the accompanying schematics, in which:

FIG. 1 shows an optical sensor, which records in three dimensions, with illumination and read out in a pixelwise fashion, it being possible to illuminate a three-dimensional object over its whole area;

FIG. 2 shows a system corresponding to FIG. 1 with a configuration of the arrangement of the light source and the receiving elements that is adapted to the measurement problem;

FIG. 3 shows a schematic arrangement of laser diodes relative to an optical system, and an arrangement of CMOS image converter elements; and FIG. 4 shows a transmitting and receiving unit above a building entrance door for the purpose of safeguarding the building.

Taking and constructing three-dimensional images plays a substantial role chiefly for identification or for access control, that is to say for surveillance tasks in general. Thus, in future a key role will be ascribed to the rapid, cost-effective and robust acquisition of three-dimensional images in industrial sensor technology. An essential precondition for this is, above all, the implementation of this sensor technology with the exclusive use of solid state technology. The applications resulting therefrom are extremely manifold and comprehensive, and open up a new generation of optical sensors for industrial metrology. These three-dimensional microsystems are used, for example, in traffic surveillance and room surveillance as well as in the guidance of transportation operations. In addition to identifying objects, it is also possible to measure speeds. A flow of material can be monitored and automated.

The range-finding system proposed here is based on the fact that consistent functional and spatial integration of microelectronics, photonics and optics has been undertaken in a microsystem with the exclusive use of solid state technology. Owing to the microelectronics, in particular the CMOS microelectronics, it is rendered possible to implement integrated, photosensitive arrangements with extremely short integration times, for example 50 ns, and thus to deduce indirectly, via the received intensity of laser pulses, the travel time of the latter, or the range of the object point from the measuring system. A reduction in the laser power required over all can be achieved by multiple repetition of pulsed exposure, integration and logic combination.

A very decisive role is accorded photonics in this system. High demands must be placed on the laser light source with regard to rise time and constancy. The rise time should be less than 1 ns. A substantial reduction in this set of problems is achieved by the novel approach of synchronizing illumination of object sections and addressing corresponding regions from the sensor array. This is to be understood to include the corresponding configuration of the measuring system, the individual light sources, which assigns individual light sources which illuminate the object points provided to corresponding receiving elements.

The principle is based on the consideration that, in the case of the use of the random image access inherent in the CMOS technology, only that pixel is illuminated at a given time whose intensity is read out instantaneously at the corresponding receiving element. Consequently, the system simultaneously resolves pixels, and it is possible to dispense with mechanical scanning. The light power then distributed over several light sources or laser diodes, which are of substantially lower power and operating serially, drastically reduces the problems of rising times and power supply as well as costs and aspects of laser protection. The measurement uncertainties, achievable with the aid of the disclosed measuring system, of ±5 cm in a measuring range from 0.5 to 5 m are realistic.

In the case of the serial operation of individual laser diodes with the corresponding receiving elements, it is possible, in turn, to permit substantially higher luminance at the site of the object than in the case of a whole-area illumination without the laser protection regulations being infringed. This leads to a substantially improved signal-to-noise ratio at the receiving elements, and thus to a substantially increased efficiency of the overall system.

FIGS. 1 and 2 show a spatially resolving range-finding system which includes on the left-hand side an arrangement with light sources 1, emitted illuminating beams 5 being guided via a divider mirror 8 and an optical system 4, and illuminating at least partially a three-dimensional object 7. Imaging beams 6 reflected by the object 7 are guided via the same optical system 4 and the divider mirror 8 onto a solid state image converter 3, 31, and evaluated by receiving elements 2 corresponding to the light sources 1. The evaluation is performed optoelectronically, and yields a complete or partial contour image of the object 7. The form of the arrangements, illustrated in FIG. 1, of the light sources 1 and the receiving elements 2 as a rectangular matrix is suitable for recording a complete three-dimensional image of an object 7. The partial illumination described by means of serially actuating light sources 1 leads overall to the complete recording of the object 7. The serial response of the light sources 1 combined with the serial reading out of the corresponding receiving elements 2 can be carried out at high speed. As illustrated in FIG. 1, the abovementioned correspondence means that an illuminating beam 5 generated centrally in the arrangement of the light sources 1 passes, after reflection at the object 7, via the divider mirror 8 into the centrally placed receiving element 2 of the solid state image converter 3. This holds in a corresponding way for all the other light sources 1 and receiving elements 2. The use of a multiplicity of light sources 1 with a corresponding number of receiving elements 2, combined with a serial illumination of the object 7 does not give rise to any sorts of problems for the power supply of the light sources in order to comply with limits of a laser protection regulation or a requisite short rise time in the case of the modulation of the light sources 1. This is to be viewed in contrast to the prior art, in which a single light source of high power is used.

FIG. 2 shows an arrangement corresponding to FIG. 1, in which the light sources 1 and the solid state image converter 31 are designed in a fashion matched to the task. The design, selected in the illustration, in the form of a cross, projects onto the object 7 merely a similar cross, which can be evaluated via the arrangement, likewise designed as a cross, of receiving elements 2. It is possible in this way to detect substantial characteristic features of an object 7, subsequent categorization being possible. This means that, in the case of a face, for example, specific contours are viewed without illuminating and evaluating the entire face.

The mode of operation of the laser diode array as an illuminating unit, the optical system 4 and the CMOS sensor array at the receiving end is illustrated schematically in FIG. 3. The light source 11, emphasized in the drawing, of the laser diode array emits an illuminating beam 5 which is guided to the object 7 via the optical system 4. The reflected imaging beam 6 is guided correspondingly via the optical system 4 onto a receiving element 21, which corresponds to the above-named light source 11 and is likewise emphasized in the drawing of FIG. 3. The currently considered and/or active illuminating beams 5 and imaging beams 6 are illustrated in FIG. 3 with continuous strokes. A corresponding statement holds for the beams illustrated by broken strokes, which are, however, present offset in time.

Possible fields of application of spatially resolving range-finding systems are speed measurement, vehicle identification, security surveillance, railroad platform surveillance, railroad grid crossing surveillance, material flow measurement on conveyor belts, or automation of crane systems by means of three-dimensional determination of position.

The intelligent surveillance of a building entrance door is sketched in FIG. 4. The transmitting/receiving unit 9 is fitted above a house door 10 of a house 11. The points of impingement of the corresponding light beams on the ground are arranged in FIG. 4 in the form of a semicircle 12. They therefore cover the area in front of the house door 10. Since the range-finding system in this case undertakes a partial illumination of an object appearing in front of the house door 10, the contour of the object can be evaluated and categorized. This means, for example, that it is possible to establish whether a dog, a cat or a person is located in front of the door. There is no need in this case to illuminate the entire area of the object. Corresponding arrangements of the beam paths can be defined for the surveillance of objects of other types. In accordance with the configuration in FIG. 4, the arrangement of the light sources 1 and the arrangement of the receiving elements 2 is likewise semicircular. In addition, each beam path can be guided specifically through an appropriately configured optical system.

We claim:

1. A spatially resolving range-finding system for carrying out measurement of the travel-time of light to an object in pixelwise fashion, comprising a mechanically fixed array of individually modulable light sources for generating light beams for illuminating said object; a mechanically fixed solid state image converter comprising a plurality of solid state light receiving elements arranged in an array corresponding to said array of light sources, and a mechanically fixed optical system for guiding light beams emanating from said sources to said object and for guiding light beams reflected from said object to said receiving elements, said optical system guiding each light beam reflected from the object to a selected receiving element corresponding to the light source from which the light beam emanated, wherein the light sources are driven by random access and the corresponding receiving elements are read-out by random access.

2. The spatially resolving range-finding system according to claim 1, wherein a divider mirror directs said reflected light beams to said receiving elements.

3. The spatially resolving range-finding system according to claim 1, wherein the arrangement of the light sources and the receiving elements are positioned immediately next to one another and facing in the direction of the object.

4. The spatially resolving range-finding system according to claim 1, wherein, the solid state light receiving elements are arranged in an array using CMOS technology.

5. The spatially resolving range-finding system according to claim 1, wherein said optical system may be selectively configured to provide that either one light source corresponds to one receiving element, several light sources correspond to one receiving element, or one light source corresponds to several receiving elements.

6. The spatially resolving range-finding system according to claim 1, wherein division is the same within the arrangements of the light sources and the receiving elements.

7. The spatially resolving range-finding system according to claim 1, wherein the array of the light sources and the array of receiving elements are both in the form of a rectangular matrix.

8. The spatially resolving range-finding system according to claim 1, wherein the array of light sources and the array of receiving elements are in a form appropriate to a specific measurement task.

9. The spatially resolving range-finding system according to claim 1, wherein both the array of the light sources and the array of the receiving elements are in a form selected from the group consisting of a line, a circle, a semicircle and a cross.

10. The spatially resolving range-finding system according to claim 1, in which a sectional view or a three-dimensional image of an object is generated.

11. The spatially resolving range-finding system according to claim 1, in which the light sources are represented by rapidly modulable laser diodes or light-emitting diodes.

12. The spatially resolving range-finding system according to claim 1, in which the light travel time measurement is a pulse travel time measurement or a phase measurement.

13. The spatially resolving range-finding system according to claim 1, for the purpose of intelligent building entrance safeguarding, railroad platform surveillance, railroad grid crossing surveillance or vehicle surveillance.

14. The spatially resolving range-finding system according to claim 1, for the purpose of surveillance of interiors of buildings or vehicles.

* * * * *